United States Patent [19]
Mead et al.

[11] 3,944,433
[45] Mar. 16, 1976

[54] LITHIUM IODINE BATTERY HAVING IMPROVED ENERGY DENSITY

[75] Inventors: Ralph T. Mead, Kenmore; Wilson Greatbatch, Clarence; Frank W. Rudolph, Depew, all of N.Y.

[73] Assignee: Wilson Greatbatch, Clarence, N.Y.

[22] Filed: Jan. 9, 1975

[21] Appl. No.: 539,730

[52] U.S. Cl. .............................. 136/83 R; 136/6 LN
[51] Int. Cl.² .......................................... H01M 4/36
[58] Field of Search ......... 136/6 LN, 83 R, 20, 137, 136/6 A

[56] References Cited
UNITED STATES PATENTS

| | | | |
|---|---|---|---|
| 3,653,966 | 4/1972 | Hill | 136/83 R |
| 3,660,163 | 5/1972 | Moser | 136/83 R |
| 3,674,562 | 4/1972 | Schneider et al. | 136/83 R |
| 3,723,183 | 3/1973 | Greatbach | 136/83 R |
| 3,773,557 | 11/1973 | Mead | 136/83 R X |
| 3,817,791 | 6/1974 | Greatbach et al. | 136/83 R |
| 3,874,929 | 4/1975 | Greatbach | 136/83 R |

*Primary Examiner*—G. L. Kaplan
*Assistant Examiner*—C. F. Lefevour
*Attorney, Agent, or Firm*—Christel & Bean

[57] ABSTRACT

A lithium-iodine cell comprising a lithium anode and a cathode comprising an iodine element, a charge transfer complex of an organic donor component and iodine, and a cathode current collector operatively positioned between the iodine element and the charge transfer complex. The iodine element comprises a solid pellet of pure, non-conductive iodine, and the organic donor component of the charge transfer complex is two-vinyl pyridine polymer. The current collector is a screen or the equivalent which allows iodine to diffuse from the iodine element through the collector to the charge transfer complex. The iodine element is optimized for maximum iodine content without regard for conductivity, and the cathode material is optimized for maximum conductivity without regard for excess iodine content.

17 Claims, 2 Drawing Figures

LITHIUM IODINE BATTERY HAVING IMPROVED ENERGY DENSITY

BACKGROUND OF THE INVENTION

This invention relates to the conversion of chemical energy to electrical energy, and more particularly to a new and improved lithium-iodine cell.

One area of use of the present invention is in providing electrical power safely to inaccessable devices in the human environment, for example to an implanted cardiac pacemaker, although the principles of the invention can be variously applied. Several types of batteries for implantable cardiac pacemakers have been proposed but heretofore all have certain limitations. Recently, a lithium-iodine cell has been proposed which advantageously has an open circuit voltage about twice that of the mercury cell, does not generate gas during the operation, and has a non-corrosive electrolyte.

A cell has been proposed including a lithium anode and a cathode comprising a charge transfer complex of an organic donor component and iodine. A typical cathode of this type of cell includes polyvinyl pyridine complexed with iodine and having excess iodine reacted in. The cathode is rendered conductive by the charge transfer complex and, at the same time, it is a diffusion source due to the excess iodine. The excess iodine insures a continuing minimal level of iodine in the complex to maintain good electrical conductivity. Having a large source of excess iodine in the cathode complex, however, can lead to many problems.

In a recently developed method for making such a cell, the organic-iodine complex is introduced to a casing, which includes the remaining cell components in the form of a pourable, tar-like or viscous substance which may be heated to an elevated temperature. When the cell is poured, the molten complex may immediately cool upon striking the lithium anode and pure non-conductive iodine may crystallize on the anode surface, thereby removing that part of the anode surface from normal operation. Also, excess iodine in the complex may adversely affect the viscosity of the cathode material thereby resulting in unwanted iodine seepage, pouring difficulties, and related problems. Furthermore, in a cathode including an organic donor component complexed with iodine and having excess iodine reacted in, only about half of the total iodine is available for electrical energy output. The remainder of the iodine appears to become permanently bound into the organic donor component matrix and thus becomes unavailable for electrical output. Thus the extent to which iodine is unavailable for electrical output results in a decrease in the energy density of the cell from the level which it could be if that iodine were available.

SUMMARY OF THE INVENTION

It is, therefore, an object of this invention to provide a new and improved lithium-iodine cell.

It is a further object of this invention to provide a new and improved cathode for a lithium-iodine cell.

It is a further object of this invention to provide a lithium-iodine cell having an improved energy density.

It is a further object of this invention to provide such a lithium-iodine cell and cathode construction which can be manufactured easily and economically.

The present invention provides a lithium-iodine cell comprising lithium anode means including a lithium element and an anode current collector operatively associated with the lithium element and cathode means including an iodine element, a charge transfer complex of an organic donor component and iodine and a cathode current collector operatively positioned between the iodine element and the charge transfer complex. A lithium-iodine electrolyte forms at the interface between the anode lithium element and the charge transfer complex. The current collector allows iodine to diffuse from the iodine element through the collector to the charge transfer complex. As a result, the iodine element may be optimized for maximum iodine content without regard for conductivity, and the cathode material may be optimized for maximum conductivity without regard for excess iodine content.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 1 is a vertical sectional view of a lithium-iodine cell according to the present invention; and FIG. 2 is a sectional view taken about on line 2—2 of FIG. 1.

DETAILED DESCRIPTION OF THE ILLUSTRATED EMBODIMENT

Figure 1:
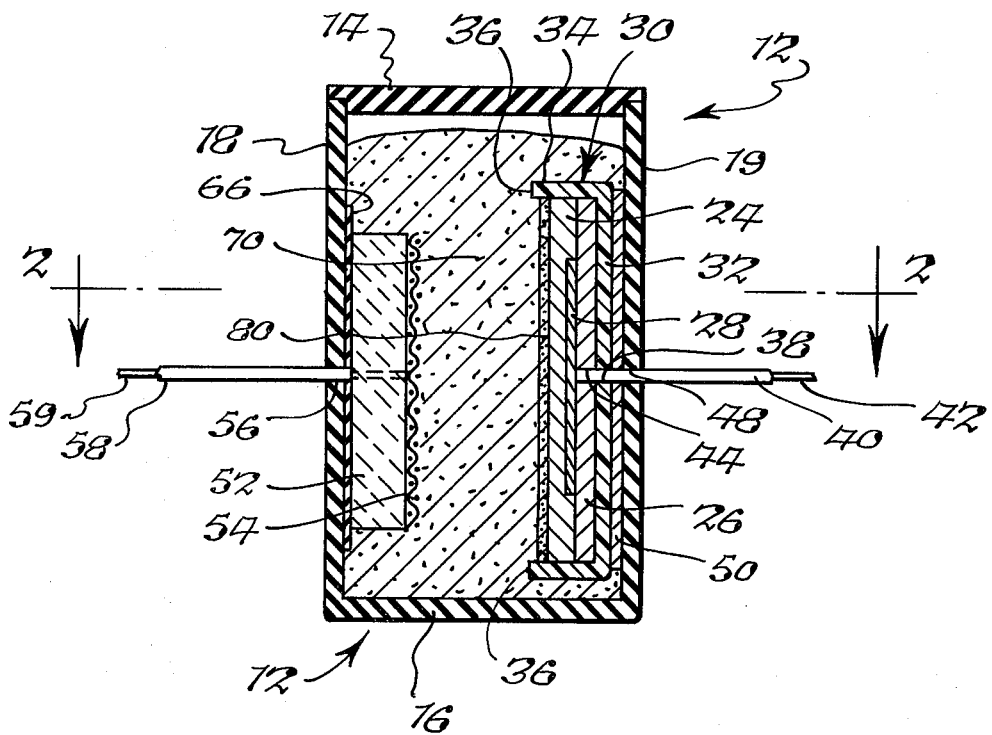
Figure 2:
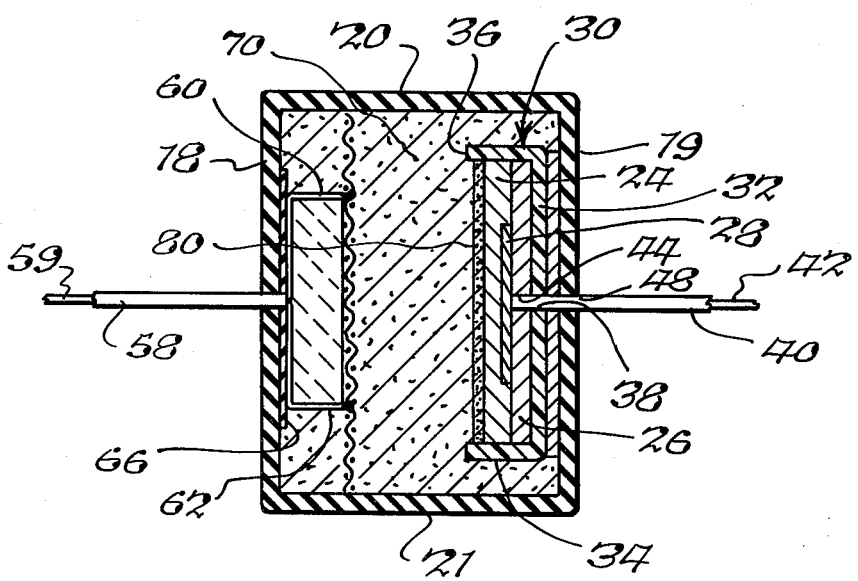

Referring now to FIGS. 1 and 2 of the drawing, a lithium-iodine cell according to the present invention includes a hollow casing generally designated 12 for receiving the cell components through one open end thereof which after assembly of the components is closed and sealed by means of a lid 14 in a manner which will be described. In the present illustration casing 12 is hollow rectangular in shape including a bottom 16 and opposite pairs of upstanding walls 18, 19 and 20, 21. Casing 12 is of a material which is non-reactive with iodine, preferably an epoxy material which has been suitably cured, and is molded or otherwise formed to be of an integral construction.

The cell according to the present invention includes anode means including an element of lithium suitably positioned within casing 12. In particular, the anode means comprises a first lithium element or plate 24 and a second element or plate 26, the two elements being pressure bonded together and against an anode current collector 28. The lithium elements 24, 26 with current collector 28 sandwiched therebetween are pressure bonded within an anode holding means 30 which is shaped to receive the lithium elements 24, 26 in a manner exposing a surface of lithium element 24 for operative relationship with the iodine-containing cathode material in the cell. In this exemplary form of holding means 30, there is a substantially planar face portion 32 and a continuous peripheral rim portion 34 extending from the face portion and terminating in an edge 36. Edge 36 is disposed in a plane substantially parallel to the plane including the exposed face of lithium element 24. Holding means 30 is of a material which does not exhibit electronic conduction when exposed to iodine, and a material found to perform satisfactorily is available commercially under the name Halar, a trademark of the Allied Chemical Company. Face portion 32 of holding means 30 is provided with a small slot or aperture 38 of a size permitting an electrical conducting means 40 to extend therethrough. The anode current collector 38 can comprise an expanded zirconium or nickel element of No. 12 mesh having a thickness of about 5 mils. Conducting means 40 comprises an electrically conducting wire or strip 42 connected at one end to collector 28 and surrounded by electrical insulation of a material which does not exhibit electronic conduction when exposed to iodine. The conducting means 40 extends through a slot or aperture 44 provided in lithium plate 26 for making electrical connection to the lithium anode. Holding means 30 thus serves as a frame or support for the sandwiched arrangement of lithium plates 24, 26 and current collector 28.

The anode shown in FIGS. 1 and 2 is formed according to the following method. The material of holding means 30, in addition to not exhbiting electronic conduction when exposed to iodine, also should have the characteristic of being pressure bondable to lithium. Lithium plate 26 is placed in holding means 30 so as to be fitted in rim portion 34 whereby the aperture 44 in plate 26 is in registry with aperture 38 of face portion 32. The strip or wire 42 is connected to anode current collector 28 beforehand, and the free end portion of conductor 40 is passed through the aligned apertures 44, 38 until the anode collector 28 is in contact with the exposed face of plate 26. Then plate 24 is placed in contact with current collector 28 and fitted within rim portion 34, whereupon the anode assembly is pressed together with a suitable force, for example about 3000 pounds, causing the assembly to be bonded together. As a result, lithium plates 24, 26 are bonded together in a manner sealing the current collector 28 between the plates 24, 26 and the peripheral juncture or edges of plates 24, 26 are sealed by rim 34 of holding means 30.

The cell of the present invention further includes a cathode means comprising an element of iodine, a charge transfer complex of an organic donor component and iodine, and a cathode current collector operatively positioned between the iodine element and the charge transfer complex, the current collector being of a material or construction allowing iodine to diffuse therethrough. In particular, an iodine element 52 in the form of a solid pellet of pure, non-conductive iodine is positioned in casing 12 adjacent wall 18. Pellet 52 is positioned generally opposite the lithium anode assembly and is spaced therefrom. A cathode current collector 54 in the form of a screen element is positioned in the cell against the surface of pellet 52 which faces the anode assembly. Collector screen 54 is preferably of zirconium mesh, and collector 54 can be of other materials and construction, for example perforated metal, which allow iodine to diffuse through it. Pellet 52 and collector 54 are held in position within casing 12 by the following illustrative arrangement. Casing wall 18 is provided with an aperture 56 for receiving a conductor 58 for making electrical connection to cathode current collector 54. The internal wire or strip 59 of conductor 58 is formed to have two end portions 60, 62 which, as shown in FIG. 2, enter through casing aperture 56 and extend in opposite directions along the surface of pellet 52 adjacent wall 18 and then along the corresponding opposite sides of pellet 52 and are connected such as by welding at their respective ends to collector 54. Thus the connection of lead end portions 60, 62 to screen 54 serves to hold or secure screen 54 and pellet 52 together. The conductor 58 as it is pulled or drawn through aperture 56 thus pulls pellet 52 and collector 54 together toward the inner surface of casing wall 18.

A spacer sheet 66 of Teflon or similar material can be located between the inner surface of wall 18 and the adjacent surface of pellet 52. Spacer 66 acts like a spring to urge pellet 52 and collector 54 into contact with the complex material during the life of the cell.

The cell of the present invention is completed by cathode material 70 comprising a charge transfer complex of organic material and iodine. The organic material should be an electron donor and can be any organic compound having a double bond or amine group. An electron donor gives the iodine sufficient conductivity for proper cell operation. A preferred organic material is polyvinyl pyridine polymer, and in particular two-vinyl pyridine polymer. The cathode material 70 can be prepared by heating the organic material, i.e., two-vinyl pyridine, to a temperature greater than the crystallization temperature of iodine and then adding iodine to the heated material. In this connection, the complex need only carry enough iodine to assure good conductivity. The resulting mixture is a viscous, flowable substance which is introduced to casing 12 in the following manner. Casing 12 is held by hand or in a fixture in an upright position whereupon the heated material 70 is poured into casing 12 through the open top thereof. The material 70 fills the interior of casing 12 in an amount sufficient to contact the exposed surface of lithium element 24 and to contact the portion of current collector 54 operatively associated with iodine element 52. Then the casing 12 is sealed at the top such as by means of lid member 14 which is placed on and cemented to the top peripheral edge of casing 12.

The lithium-iodine cell according to the present invention operates in the following manner. As soon as the iodine-containing cathode material 70 is placed in casing 12 in operative contact with lithium plate 24, a lithium-iodine electrolyte begins to form at the interface and an electrical potential difference exists between the anode and cathode electrical leads. Iodine from pellet 52 diffuses through collector 54 to cathode material 70. In particular, iodine vapor containing molecules presumably is emitted from pellet 52 and travels to and through collector 54, and some iodine ions may be formed at collector 54 and travel with the vapor to cathode material 70. In the cell of the present invention, therefore, a continuing supply of iodine is provided to the cathode in such a manner that the iodine is not required to be in an electrically conductive state. In other words, the conduction aspect of the iodine cathode is mechanically separated from the diffusion aspect of the iodine reservoir. The two cathode functions of conductivity and diffusion are mechanically separated by placing cathode current collector 54 operatively between the iodine element 52 and the cathode material 70 comprising a charge transfer complex of an organic donor component and iodine. In this manner, the iodine pellet reservoir 52 need only diffuse iodine through the current collector or screen 54. The iodine element need not be electrically conductive. Thus pellet 52 is pure iodine and has no electrical conductivity additives therein such as carbon or graphite. The material 70 comprising the charge transfer complex of an organic donor component and iodine, i.e., two-vinyl pyridine iodide, need only conduct. It does not need to be an iodine reservoir since that function is provided by pellet 52. The material 70 need only carry enough iodine to assure good conductivity, and as iodine is lost it will be replaced from pellet 52. Thus the pellet 52 may be optimized for maximum iodine content without regard for conductivity, and the cathode material 70 may be optimized for maximum conductivity without regard for excess iodine content.

Another advantage provided by the cell of the present invention is that more ampere-hour capacity can be built into the cell. If the cathode were to consist of a charge transfer complex of an organic donor component and iodine with excess iodine reacted in, only about two thirds the total iodine would be available for electrical energy output. The rest of the iodine appears to become permanently bound into the organic donor component matrix and is unavailable for energy output. Thus a cell with an amount of iodine equivalent to about 4 ampere hours gives an electrical charge output of only about 3 ampere hours. In the cell of the present invention, on the other hand, only a small portion of the cathode, for example only about 10%, need be the material 70 comprising the charge transfer complex of organic donor component and iodine with iodine reacted in. The remaining portion of the cathode, i.e., about 90%, can be the pure iodine pellet 52. Thus most of the iodine in the cell of the present invention will become available for electrical output and only a small amount, perhaps about 5%, will remain locked in the 10% of organic donor complex material. By reducing the amount of the organic-iodine complex material, i.e., polyvinyl pyridine iodine, needed in the cathode, the rate of impedance rise of the cell is lowered, particularly at the end of life of the cell.

The operation of the cell of the present invention can be improved further to have a relatively low cell impedance and a relatively constant long-term cell impedance by providing on the operative surface of the lithium anode a coating or layer 80 of an organic electron donor, preferably but not necessarily the organic component of the charge transfer complex material of the cathode. In particular, when the anode has been formed and prior to assembly of a completed cell, a solution of two-vinyl pyridine polymer in anhydrous benzene is prepared with two-vinyl pyridine present in the range from about 10% to about 20% by weight with a strength of about 14% by weight of two-vinyl pyridine being preferred. While two-vinyl pyridine and four-vinyl pyridine or other organic electron donor materials such as poly-three-ethyl-two vinyl pyridine can be used, two-vinyl pyridine is preferred because of its more fluid characteristic. The solution is applied to the exposed surface of lithium plate 24 in a suitable manner, for example by application with a brush. The presence of the anhydrous benzene serves to remove moisture thereby preventing any adverse reaction with the lithium plate. The coated anode then is exposed to a desiccant such as barium oxide for a time, for example in the neighborhood of about 24 hours, sufficient to remove the benzene from the coating. The foregoing procedure can be repeated a number of times, for example three times, to provide a corresponding number of layers or coatings thereby resulting in a final coating of increased thickness, being a composite of a number of coatings or layers successively applied.

The provision of layer or coating 80 was found to reduce the cell impedance to about one-half the impedance of a cell of similar construction but without the pre-coated anode. This desirable reduction in cell impedance is believed to result from a better and improved electrically effective contact area between the cathode material 70 and the anode lithium element. Coating 80 serves as a protective buffer between the pure lithium plate 24 and the relatively hot cathode material 70 as it is poured into the cell casing. Coating 80 protects the anode from immediate recrystallization of iodine on the surface of lithium plate 24, and iodine in complexed form slowly penetrates through the coating 80 to lithium plate 24. Further reduction in cell impedance results from an increase in the thickness of coating or layer 80.

Thus, the cell of the present invention has an improved energy density, and the provision of coating or layer 80 adds the additional advantages of a greater utilization of the surface of the anode lithium element by the cathode material and a reduction in cell impedance, these being enhanced by increasing the thickness of the coating or layer.

It is therefore apparent that the present invention accomplishes its intended objects. While a single embodiment of the present invention has been described in detail, this is for the purpose of illustration, not limitation.

We claim:

1. A lithium-iodine cell comprising:
   a. lithium anode means including a lithium element and an anode current collector operatively associated with said lithium element; and
   b. cathode means comprising an iodine element, a charge transfer complex of an organic donor component and iodine and a cathode current collector operatively positioned between said iodine element and said charge transfer complex and operative to diffuse iodine from said iodine element to said charge transfer complex.

2. Apparatus according to claim 1, wherein said iodine element is pure solid iodine and non-conductive.

3. Apparatus according to claim 1, wherein said iodine element has a surface disposed toward said anode and said cathode current collector is positioned adjacent said surface.

4. Apparatus according to claim 1, wherein said organic donor component comprises polyvinyl pyridine polymer.

5. Apparatus according to claim 1, wherein said organic donor component comprises two-vinyl pyridine polymer.

6. Apparatus according to claim 1 further including a hollow casing containing said anode means and said cathode means, said iodine element being positioned adjacent an inner surface of said casing, and electrical conductor means extending through said casing and connected to said cathode current collector.

7. Apparatus according to claim 6, wherein said iodine element has a surface adjacent an inner surface of said casing and another surface disposed toward said anode, said cathode current collector being positioned adjacent said other surface and wherein said electrical conductor means is connected to said cathode current collector at spaced locations whereby said conductor means holds said current collector against said iodine element and holds said iodine element against said casing.

8. Apparatus according to claim 3 further including a hollow casing containing said anode means and said cathode means, said iodine element being positioned adjacent an inner surface of said casing, and further including spacer means between said iodine element and said casing for maintaining said iodine element and said cathode current collector in operative contact with said charge transfer complex.

9. Apparatus according to claim 1, wherein said anode means comprises a pair of lithium elements bonded together and against said current collector in a manner sealing said current collector between said elements, said current collector having an electrical lead connected thereto and extending from said lithium elements.

10. Apparatus according to claim 9, wherein said anode further comprises a frame member continuously surrounding the peripheral edges of said lithium elements in a manner sealing said edges, said electrical lead extending through said frame member.

11. Apparatus according to claim 1 further including a coating on said lithium element and operatively associated with said cathode means, said coating being of an organic electron donor component material.

12. Apparatus according to claim 11, wherein said coating is of the organic donor component material of said charge transfer complex material.

13. Apparatus according to claim 11, wherein said coating is of polyvinyl pyridine polymer.

14. Apparatus according to claim 11, wherein said coating is of two-vinyl pyridine polymer.

15. Apparatus according to claim 11, wherein said coating is of four-vinyl pyridine polymer.

16. Apparatus according to claim 11, wherein said coating is of three-ethyl-two-vinyl pyridine polymer.

17. Apparatus according to claim 11, wherein said coating is a composite of a number of coatings.

* * * * *